United States Patent [19]

Harwood

[11] Patent Number: 4,500,910
[45] Date of Patent: Feb. 19, 1985

[54] HUE CONTROL SYSTEM

[75] Inventor: Leopold A. Harwood, Bridgewater, N.J.

[73] Assignee: RCA Corporation, New York, N.Y.

[21] Appl. No.: 445,488

[22] Filed: Nov. 30, 1982

[51] Int. Cl.³ ............................................. H04N 9/535
[52] U.S. Cl. ....................................................... 358/28
[58] Field of Search .................................... 358/28, 25

[56] References Cited

U.S. PATENT DOCUMENTS 3,780,219 12/1973 O'Toole ................................. 358/28
4,051,519 9/1977 Harwood .............................. 358/21

Primary Examiner—John C. Martin
Assistant Examiner—Erin A. McDowell
Attorney, Agent, or Firm—Eugene M. Whitacre; Paul J. Rasmussen; William H. Meagher

[57] ABSTRACT

Quadrature-related outputs of synchronized color reference oscillator at +(R-Y) and +(B-Y) phases are applied to a first matrix to develop a first matrixed signal of a third intermediate phase. Additional matrixing operations on the oscillator outputs develop second and third matrixed signals of different phases symmetrically disposed about the third phase. A differential amplifier, of substantially fixed gain, with differential inputs respectively responsive to the second and third matrixed signals, develops a fourth matrixed signal, with a phase in quadrature relation with said third phase, across an output load. The reference signal input for a demodulator is derived from signals appearing across said output load. A controlled amplifier, fed with the first matrixed signal, is disposed to supply said first matrixed signal as an additional oscillatory signal to said output load, when desired for hue adjustment purposes, with the magnitude of the supplied additional signal dependent upon the magnitude of difference, if any, between an adjustable control voltage and a reference voltage, and the polarity of the supplied additional signal dependent upon the sense of said difference.

15 Claims, 1 Drawing Figure

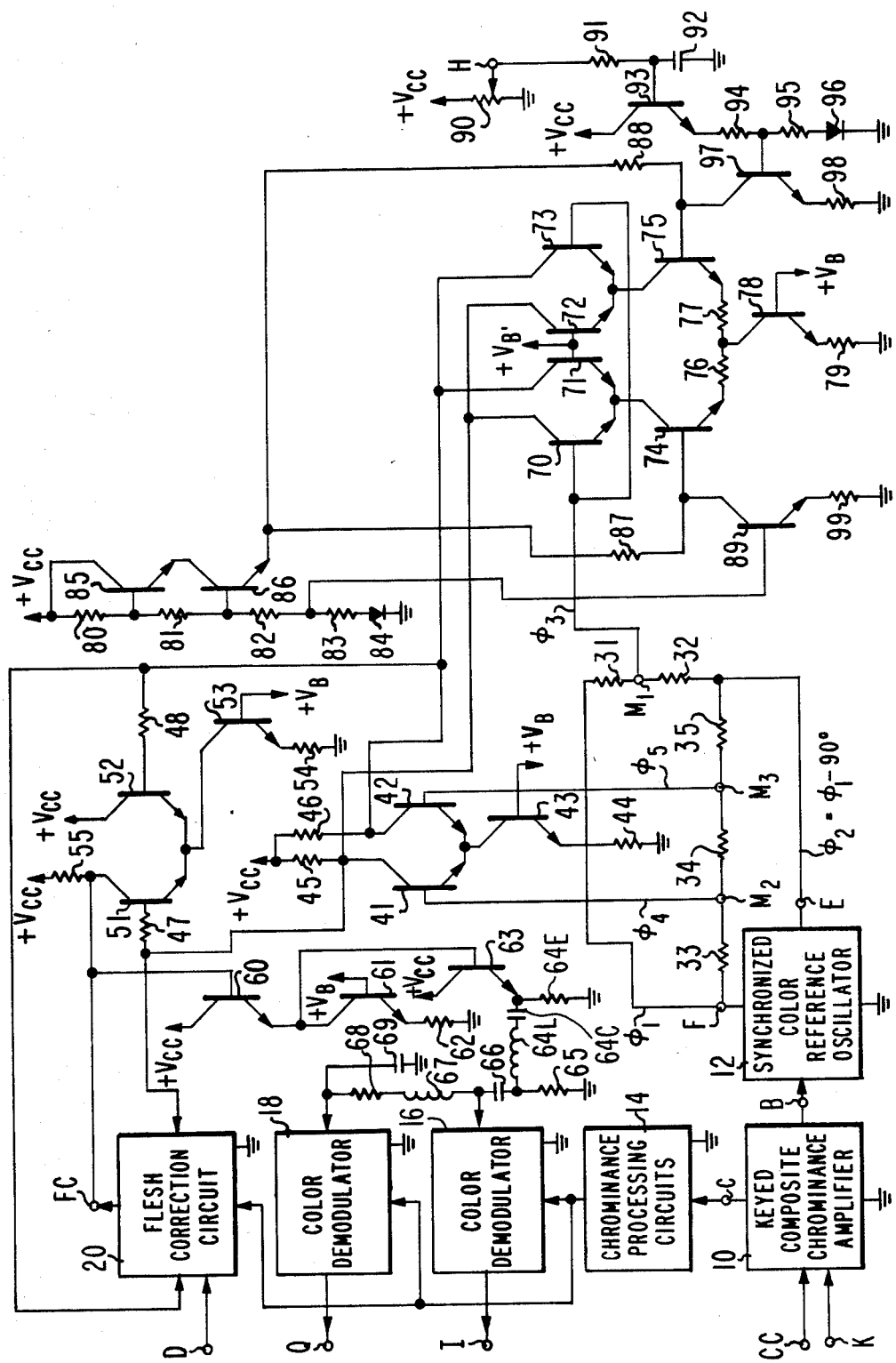

HUE CONTROL SYSTEM

The present invention relates generally to apparatus for reproducing color images in response to composite color television signals, and particularly to a novel and improved hue control system therefor, for use by a viewer to effect desired alterations of the hues of the reproduced color images.

In a color television system of the NTSC type, the transmitted composite color television signal includes, for color synchronization purposes, periodically recurring bursts of color subcarrier frequency oscillations of constant amplitude, and of a reference phase which leads the chrominance signal phases associated with the +I, +R-Y, and +Q color-difference signals by 57°, 90°, and 147°, respectively, and differs from the chrominance signal phase associated with the +B-Y color-difference signal by 180°. When receivers for such a system employ APFC circuits to synchronize a local color reference oscillator with the burst component of received signals, as, for example, in the manner shown in U.S. Pat. No. 4,020,500—Harwood, there is typically available from the oscillator a first oscillatory signal comprising reference oscillations differing in phase from the burst phase by 90°, as well as a second oscillatory signal in quadrature relationship with the first oscillatory signal, for use in developing the reference oscillation inputs for the receiver's color demodulators.

While a variety of color demodulator arrangements may be used in a receiver for signals of the aforementioned NTSC type, a particularly advantageous arrangement employs a pair of color demodulators supplied with reference oscillations of such phases as to effect I-axis and Q-axis demodulation, respectively, of the received chrominance signal. With such a demodulator arrangement, one may, for example, reliably recover high frequency (i.e., 500 to 1500 KHz.) color-difference signal components associated with the I color-difference signal so as to provide a color image with high color resolution. An I, Q color demodulator arrangement is also convenient for use in association with flesh tone correction circuitry of the type disclosed, for example, in U.S. Pat. No. 3,663,744—Harwood and U.S. Pat. No. 3,996,608—Harwood, where an additional I-axis detection of the chrominance signal is desired for flesh tone recognition purposes.

A conventional facility provided in receivers of the aforementioned NTSC type is a manual hue control, permitting a viewer to adjust the hues of the reproduced color image so as to correct perceived hue errors and/or accommodate the viewer's individual hue preferences. Typically, such a control effects a common shift of the phases of the reference oscillations supplied to the receiver's demodulators so as to cause the desired hue adjustment; and accordingly is usually interposed between the receiver's color reference oscillator and the reference signal input terminals of the color demodulators.

The present invention is directed to a novel hue control system, particularly suitable for use in receivers employing an I, Q demodulator arrangement, which derives from burst-referenced oscillatory signals of the type mentioned above an I-demodulator reference signal input of a phase adjustable over a range reliably centered about that phase which results in I-axis demodulation of the received chrominance signal.

In accordance with the principles of the present invention, a first reference oscillator output maintained in a quadrature phase relation with a received burst phase, and a second reference oscillator output in a quadrature phase relation with the first output, are subject to a first matrixing operation to develop a first matrixed signal of a third phase intermediate the phases of the respective oscillator outputs. Additional matrixing operations on the oscillator outputs develop second and third matrixed signals of different phases symmetrically disposed about the third phase. A differential amplifier, of substantially fixed gain, with differential inputs respectively responsive to the second and third matrixed signals, develops a fourth matrixed signal, with a phase in quadrature relation with said third phase, across an output load. The reference signal input for a first demodulator is derived from signals appearing across said output load; with the parameters of the second and third matrixing operation establishing the phase of the fourth matrixed signal in such manner as to normally effect I-axis demodulation of the chrominance signal in said first demodulator.

In further accordance with the principles of the present invention, a controlled amplifier, fed with the first matrixed signal, is disposed to supply said first matrixed signal as an additional oscillatory signal to said output load, when desired for hue adjustment purposes, with the magnitude of the supplied version of the first matrixed signal dependent upon the magnitude of difference between an adjustable control voltage and a reference voltage, and the polarity of the supplied version of the first matrixed signal dependent upon the sense of said difference. At a substantially centrally located point in the control voltage adjustment range, a zero difference results in nulling of the controlled amplifier output, whereby the phase of the fourth matrixed signal, undisturbed by a first matrixed signal contribution, is determinative of the phasing of the reference signal input to the first demodulator. With a quadrature phase shift network, being coupled between the reference signal input terminal of the first demodulator and the reference signal input terminal of a second demodulator, the occurrence of I-axis demodulation in the first demodulator, under the central adjustment condition producing nulling of the controlled amplifier output, is accompanied by Q-axis demodulation in the second demodulator. Similar magnitude shifts of similar sense from these axes of demodulation result when the hue control is varied from the null producing adjustment condition to permit a contribution from the first matrixed signal, of a selected magnitude and a selected polarity, to alter the phasing of the resultant signal appearing across the shared output load.

In accordance with an illustrative embodiment of the present invention, the first matrixing operation employs a pair of matrixing resistors connected in series between respective output terminals of the reference oscillator, with an output lead connected to the junction of the resistors, while the second matrixing operation employs a trio of matrixing resistors connected in series between said oscillator output terminals, with an output lead connected to the junction of the middle resistor and an outer resistor. In this embodiment, the third matrixing operation also relies on the latter trio of resistors, with an output lead connected to the junction of the middle resistor and the other outer resistor.

In the accompanying drawing, the sole FIGURE illustrates, partially schematically and partially by block representation, a chrominance signal processing section of a color television receiver incorporating a hue control system in accordance with an embodiment of the present invention.

The chrominance signal processor of the drawing includes a keyed composite chrominance amplifier 10, which receives at input terminal CC a composite chrominance signal comprising (a) a chrominance component formed of color subcarrier waves modulated in phase and amplitude in accordance with the hue and saturation of color images to be displayed, and (b) a color synchronizing component formed of periodically recurring bursts of color subcarrier frequency oscillations of a reference amplitude and phase. The keyed composite chrominance amplifier 10 functions to separate the color synchronizing component from the image-representative modulated color subcarrier waves, in response to a suitably timed keying pulse input supplied to input terminal K. Illustratively, the keyed composite chrominance amplifier 10 may take the form of the burst separating apparatus illustrated in U.S. Pat. No. 4,038,681—Harwood, and provides a first output comprising separated color synchronizing bursts at output terminal B, and a second output comprising the image-representative modulated color subcarrier waves (from which the color synchronizing bursts have been removed) at output terminal C.

The output signals appearing at terminal C are subject to additional processing in chrominance processing circuits 14. Illustratively, the processing functions associated with chrominance processing circuits 14 include manual chroma control, color kill, and chroma overload protection, and are achieved by circuitry of the type shown, for example, in U.S. Pat. No. 4,054,905—Harwood, et al. Where provision is additionally made for joint control of the magnitudes of luminance and chrominance components via a manual "picture" control adjustment, the circuitry of the aforesaid Harwood, et al. patent may desirably be modified in the manner shown, for example, in U.S. Pat. No. 4,318,051—Harwood, et al., to accommodate the additional control function.

The processed signal output of chrominance processing circuits 14 is supplied as the modulated signal input to a pair of color demodulators 16 and 18, each effecting a synchronous detection of the modulated color subcarrier wave input in response to reference oscillations of a predetermined different phase supplied to an additional input of the respective demodulator. The development of the reference oscillation inputs for color demodulators 16, 18 will be described subsequently.

The outputs of the respective color demodulators 16, 18 comprise the I color-difference signal input, and the Q color-difference signal input, respectively, for the receiver's matrix circuit, which develops from combinations of such signal inputs a set of color-difference signals of R-Y, B-Y and G-Y form. U.S. Pat. No. 4,272,778—Harwood, et al., for example, illustrates circuitry which may be advantageously utilized for such a matrixing function.

The processed signal output of chrominance processing circuits 14 is also applied to a flesh correction circuit 20, which functions, when enabled, to provide automatic correction of flesh tones in the color images reproduced by the color television receiver. Illustratively, flesh correction circuit 20 employs circuitry of the general form shown in U.S. Pat. No. 3,996,608—Harwood in performance of its correction function. The flesh correction circuit 20 is desirably selectively subject to disabling by circuitry coupled to input terminal D, in the manner, for example, shown in U.S. Pat. No. 3,982,273—Cochran. The effect of the operation of the flesh correction circuit 20, when enabled, upon the reference oscillation inputs to the color demodulators 16, 18 will be discussed subsequently.

The separated color synchronizing bursts appearing at output terminal B of the keyed composite chrominance amplifier 10 are applied as a synchronizing input to a synchronized color reference oscillator 12. The oscillator 12, which develops reference oscillation outputs synchronized in frequency and phase with the incoming bursts, illustratively is of the general form disclosed in U.S. Pat. No. 4,020,500—Harwood, and desirably may be of the particular circuit shown in the copending U.S. patent application Ser. No. 383,263, filed on May 28, 1982 for T. Fang, et al.

One of the reference oscillation outputs of oscillator 12, appearing at output terminal F, comprises subcarrier frequency oscillations of a first phase ($\phi_1$) which is in quadrature with the $-(B-Y)$ phase of the color synchronizing bursts delivered to oscillator 12. The other reference oscillation output of oscillator 12, appearing at output terminal E, comprises subcarrier frequency oscillations of a second phase ($\phi_2$) which lags $\phi_1$ by 90°.

A pair of matrixing resistors 31 and 32 are connected in series between oscillator output terminals E and F. A first matrix output signal, appearing at terminal $M_1$ at the junction of resistors 31 and 32, comprises reference oscillations of a third phase ($\phi_3$), which lies between the quadrature-related first and second phases.

An additional trio of matrixing resistors 33, 34, 35 are connected in series between oscillator output terminals E and F. The resistance values for resistors 33, 34 and 35 are so related that a second matrix output signal appears at output terminal $M_2$ (at the junction of resistors 33 and 34) with a fourth phase ($\phi_4$) which leads $\phi_3$ by a predetermined (acute) phase angle, whereas a third matrix output signal appears at output terminal $M_3$ (at the junction of resistors 34 and 35) with a fifth phase ($\phi_5$) which lags $\phi_3$ by said predetermined phase angle.

A pair of NPN transistors 41 and 42 are disposed as a first differential amplifier, with their emitter electrodes interconnected. The collector electrodes of transistors 41 and 42 are connected via respective load resistors 45, 46 to the positive terminal ($+V_{cc}$) of an operating potential supply. An NPN transistor 43 is disposed as a current source for the differential amplifier, with its collector electrode directly connected to the interconnected emitter electrodes of transistors 41, 42, with its emitter electrode returned via a resistor 44 to the (grounded) negative terminal of the operating potential supply, and with its base electrode connected to the positive terminal ($+V_B$) of a bias potential supply. A direct connection supplies the second matrix output signal (of phase $\phi_4$) from terminal $M_2$ to the base electrode of differential amplifier transistor 41, while an additional direct connection supplies the third matrix output signal (of phase $\phi_5$) from terminal $M_3$ to the base electrode of differential amplifier transistor 42.

An additional pair of NPN transistors 51, 52, disposed with their emitter electrodes interconnected, form a second differential amplifier which is rendered responsive to push-pull outputs of the first differential amplifier. A single-ended output for the second differential amplifier appears across a load resistor 55 connected between the collector electrode of transistor 51 and the +$V_{cc}$ terminal. The collector electrode of transistor 52 is directly connected to the +$V_{cc}$ terminal. An NPN transistor 53 serves as a current source for the second differential amplifier, with its collector electrode directly connected to the interconnected emitter electrodes of transistors 51, 52, with its emitter electrode returned to ground via a resistor 54, and with its base electrode connected to the +$V_B$ bias supply terminal. Signal drive for the second differential amplifier is supplied via series coupling resistors 47, 48, with resistor 47 connected between the collector electrode of transistor 41 and the base electrode of transistor 51, and with resistor 48 connected between the collector electrode of transistor 42 and the base electrode of transistor 52. The respective signals appearing at the collector electrodes of transistors 41 and 42 are also supplied directly to flesh correction circuit 20 as antiphasal inputs thereto for purposes to be subsequently described.

An NPN transistor 60 is disposed as a first emitter-follower responsive to the output of the second differential amplifier, with the collector electrode of transistor 60 directly connected to the +$V_{cc}$ terminal, and with the base electrode of transistor 60 directly connected to the collector electrode of transistor 51. An emitter load for transistor 60 includes NPN transistor 61, disposed as a current source, with its collector electrode directly connected to the emitter electrode of transistor 60, with its emitter electrode returned to ground via a resistor 62, and with its base electrode connected to the +$V_B$ bias supply terminal.

NPN transistor 63 forms a second emitter-follower responsive to the output of the first emitter-follower. The base electrode of transistor 63 is directly connected to the emitter electrode of transistor 60, while the collector electrode of transistor 63 is directly connected to the +$V_{cc}$ terminal. An emitter load for transistor 63 includes resistor 64E, shunted by the series combination of a capacitor 64C, an inductor 64L and a resistor 65, connected in the order named between the emitter electrode of transistor 63 and ground. A second series combination is formed by a capacitor 66, an inductor 67, a resistor 68 and a capacitor 69, which are connected in the order named between the junction of elements 64L, 65 and ground.

Capacitor 64C and inductor 64L form a series resonant circuit which effects a desired bandpass filtering of reference oscillations passed by the emitter-follower transistor 63. Signals appearing at the junction of capacitor 66 and inductor 67 form the reference oscillation input to the I color demodulator 16, while signals appearing at the junction of resistor 68 and capacitor 69 form the reference oscillation input to the Q color demodulator. Elements 67, 68, 69 form a quadrature phase shifting circuit, ensuring that the reference oscillation input to the Q demodulator 18 lags the reference oscillation input to the I demodulator by 90°.

The resistors 45 and 46, in addition to serving as load resistors for the first differential amplifier, also serve as load resistors for respective third and fourth differential amplifiers, now to be described. The third differential amplifier comprises a pair of NPN transistors 70,71 disposed with their emitter electrodes interconnected, while the fourth differential amplifier comprises a pair of NPN transistors 72,73 disposed with their emitter electrodes interconnected. The base electrode of transistor 70 of the third differential amplifier, and the base electrode of transistor 73 of the fourth differential amplifier, are directly connected to matrix output terminal $M_1$ so as to receive reference oscillations of phase $\phi_3$. The base electrodes of the other transistors (71,72) of the third and fourth differential amplifiers are directly connected to the positive terminal (+$V_B'$) of an additional bias potential supply. The collector electrodes of transistors 70 and 72 are directly connected to the collector electrode of transistor 41 of the first differential amplifier, while the collector electrodes of transistors 71 and 73 are directly connected to the collector electrode of transistor 42 of the first differential amplifier.

It will be seen that the third differential amplifier (70,71) is disposed so as to develop an inverted version of the $\phi_3$ oscillations across load resistor 45, and a non-inverted version of the $\phi_3$ oscillations across load resistor 46. Conversely, the fourth differential amplifier (72,73) is disposed so as to develop a non-inverted version of the $\phi_3$ oscillations across load resistor 45, and an inverted version of the $\phi_3$ oscillations across load resistor 46. If the gains of the third and fourth differential amplifiers are equal, their outputs mutually cancel so that there is no net contribution therefrom to be combined with the outputs of the first differential amplifier (41,42). If, however, the gains of the third and fourth differential amplifiers differ, respective antiphasal versions of the $\phi_3$ oscillations appear across each of the load resistors 45,46 for combination with respective antiphasal outputs of the first differential amplifier, with the magnitude of each of such $\phi_3$ oscillation versions dependent upon the magnitude of the gain difference, and the respective polarities thereof dependent upon the sense of the gain difference.

Differential gain control of the third and fourth differential amplifiers is effected by a gain control system which includes a pair of NPN transistors 74 and 75 disposed with their emitter electrodes interconnected via the series combination of resistors 76 and 77. Current is supplied to the emitter electrodes of transistors 74 and 75 by an NPN current source transistor 78 disposed with its collector electrode directly connected to the junction of resistors 76 and 77, with its base electrode directly connected to the +$V_B$ bias supply terminal, and with its emitter electrode returned to ground via resistor 79. Transistor 74, disposed with its collector electrode directly connected to the interconnected emitter electrodes of transistors 70 and 71, serves as a current source for the third differential amplifier. Transistor 75, disposed with its collector electrode directly connected to the interconnected emitter electrodes of transistors 72 and 73, serves as a current source for the fourth differential amplifier.

A voltage divider provided for bias supply purposes includes the series combination of resistor 80, resistor 81, resistor 82, resistor 83, and forward biased diode 84, connected in the order named between the +$V_{cc}$ supply terminal and ground. A point on the divider, at the junction of resistors 81 and 82 is connected via the base-emitter path of an NPN emitter-follower transistor 86, in series with respective dropping resistors 87 and 88 (of substantially matched value), to the base electrodes of the respective gain controlling transistors 74 and 75. Transistor 86 is disposed with its collector electrode connected to the +$V_{cc}$ terminal via the emitter-collector path of NPN transistor 85, with its base electrode directly connected to the junction of divider resistors 81, 82 and with its emitter electrode directly connected to the junction of dropping resistors 87,88. The base electrode of transistor 85 is directly connected to the junction of divider resistors 80 and 81.

The current drawn through dropping resistor 87 is determined by an NPN current source transistor 89 disposed with its collector electrode directly connected to the base electrode of transistor 74, with its base electrode directly connected to the junction of divider resistors 82 and 83, and with its emitter electrode returned to ground via resistor 99. The voltage drop across resistor 87 determined by this current establishes a reference DC potential at the base electrode of transistor 74.

The current drawn through dropping resistor 88 is adjustable in magnitude, as determined by adjustment of the biasing of an NPN current source transistor 97, of a construction substantially identical to that of current source transistor 89, and disposed with its collector electrode directly connected to the base electrode of transistor 75, and with its emitter electrode returned to ground via resistor 98 (substantially matched in value with resistor 99). For control of the bias applied to the base electrode of current source transistor 97, a potentiometer 90 is provided, with its fixed end terminals connected to the $+V_{cc}$ supply terminal, and to ground, respectively, and with its adjustable tap (terminal H) connected via a resistor 91 to the base electrode of an NPN emitter-follower transistor 93. A filter capacitor 92 is connected between the base of transistor 93 and ground. Transistor 93 is disposed with its collector electrode directly connected to the $+V_{cc}$ supply terminal, and with its emitter electrode returned to ground via the series combination of resistor 94, resistor 95, and diode 96 in the order named. The junction of resistors 94 and 95 is directly connected to the base electrode of current source transistor 97.

Elements 91, 93, 94, 95, 96 form a level shifting circuit serving to translate the $+V_{cc}$-to-ground voltage adjustment range at terminal H to a narrower, differently centered range at the base electrode of transistor 97. Illustratively, the parameters of the level shifting circuit are selected so that the voltage adjustment range at the base electrode of transistor 97 is centered about a voltage substantially matching the divider output voltage supplied to the base electrode of transistor 89. With potentiometer 90 constructed as a linear potentiometer, a desirable result of such parameter selection is that adjustment of the potentiometer tap near a midpoint position results in biasing of the base electrode of gain controlling transistor 75 at a potential equal to the reference DC potential at which the base electrode of gain controlling transistor 74 is maintained. Under the aforementioned conditions of equality of potential at the base electrodes of transistors 74 and 75, the current supplied by current source transistor 78 splits equally between transistors 74 and 75, with the consequence that the gains of the third and fourth differential amplifiers are equal.

In explanation of the operation of the above-described circuitry, it is appropriate to first consider what takes place when an adjustment of the tap of potentiometer 90 establishes the previously mentioned balance condition where the gains of the third differential amplifier (70,71) and of the fourth differential amplifier (72,73) are equal. Under such a condition, the reference oscillations supplied to the demodulators 16 and 18 are unaffected by the oscillations of $\phi_3$ phase derived at terminal $M_1$. Neglecting for the moment the effect of the operation of flesh correction circuit 20 (as, for example, by assuming an input at terminal D which disables flesh correction circuit 20), it will be recognized that the reference oscillation drive for the demodulators will be directly determined by the resultant of the differential driving of the first differential amplifier (41,42) with oscillations of the $\phi_4$ and $\phi_5$ phases, derived from terminals $M_2$ and $M_3$.

The parameters of the matrix 33, 34, 35 are desirably chosen so that such a resultant produces I-axis demodulation in color demodulator 16 and Q-axis demodulation in color demodulator 18. For achievement of such results, however, one must take into account differences, if any, in (a) the net phase shift suffered by the chrominance component in passing from terminal C to the modulated signal inputs of the demodulators, and (b) the net phase shift suffered by the reference oscillations in passing from oscillator 12 to the reference oscillation input of demodulator 16 via the first and second differential amplifiers.

In a practical embodiment of the present invention, an excess of phase lag in the reference oscillation path of the order of 12° was encountered. Compensation for this excess in phase lag in the reference oscillation path was provided by introduction of an offsetting phase lead in the design of the matrix 33, 34, 35, and of the matrix 31, 32. In particular, with the $\phi_1$ output of oscillator 12 bearing a $+(R-Y)$ phase, and the $\phi_2$ output of oscillator 12 bearing a $+(B-Y)$ phase, a choice of equal resistance values for resistors 31 and 32 resulted in $\phi_3$ corresponding to a phase which leads the $+Q$ phase by 12°, while a choice of equal resistance values for resistors 33 and 35 resulted (under the aforementioned balance condition) in the development of oscillations across load resistor 46 of a phase leading the I phase by 12°, and oscillations across load resistor 45 of a phase leading the $-I$ phase by 12°. When the second differential amplifier (51,52) is driven with such signals, the resultant reference oscillation input supplied to the I demodulator 16 is phased appropriately for I-axis demodulation. With the phase shift difference compensation provided in this manner, the goal of I-axis demodulation in demodulator 16 and Q-axis demodulation in demodulator 18 is readily achieved for the balance condition established at the center of the hue control range.

Movement of the tap of the potentiometer 90 from its balance setting introduces an unbalance of the third and fourth differential amplifiers, so that $\phi_3$ oscillations of selected magnitudes and polarities are mixed with the outputs of the first differential amplifier (41,42) for hue adjustment purposes. The width of the resultant hue adjustment range is simply determined by the ratio of the currents provided by the respective current source transistors 43 and 78. With equal values for these currents, for example, a hue adjustment range of $\pm 45°$ is obtained. In an illustrative embodiment of the present invention, however, the resistance value (800 ohms) for resistor 79 was chosen to be smaller than the resistance value (1 kilohm) for resistor 44, so as to obtain a hue adjustment range width greater than 90°.

When flesh correction circuit 20 is in an enabled state, it is capable of developing an output at terminal FC which combines with the output of the second differential amplifier (51,52) across load resistor 55 to dynamically alter the reference oscillation inputs to the demodulators 16 and 18. As explained in greater detail in the previously mentioned U.S. Pat. No. 3,996,608, the instance of such dynamic alteration are confined to those periods when the received modulated color subcarrier waves incorporate a component of $+I$ phase. For recognition of such periods, the flesh correction circuit 20 includes an I phase detector, responsive to the output of the chrominance processing circuits 14 and to the reference oscillation outputs appearing at the collectors of transistors 41 and 42. The offsetting phase lead introduced in the design of the matrices, mentioned previously, assures that the I phase detector of the flesh correction circuit 20 receives properly phased inputs.

The flesh correction circuit 20 additionally includes a modulator which delivers a limited version of the received modulated color subcarrier waves to terminal FC with a magnitude determined by the I phase detector output. Because of an additional delay associated with this processing of the modulated color subcarrier waves, proper timing for the combination of the flesh correction output with the output of the first differential amplifier (41,42) dictates the introduction of a compensating delay for the latter input to the combiner. For such compensation purposes, the resistance values of the series coupling resistors 47, 48 are selected so that, in combination with the interelectrode capacitances exhibited at the base electrodes of transistors 51 and 52, a compensating phase lag of appropriate magnitude is provided for the reference oscillations coupled thereby.

In order that this phase lag, introduced only for combination timing purposes, does not upset the desired demodulation axis selection at the demodulators 16 and 18, a compensating phase lead is provided to cancel out any net effect of the phase lag associated with resistors 47, 48 on the demodulation axes. This compensating phase lead is introduced by the series capacitor 66, in cooperation with the input resistance exhibited at the reference oscillation input of demodulator 16.

Elements 64L, 64C desirably form a series resonant circuit exhibiting resonance at the color subcarrier frequency. Filtering of the reference oscillation drive (which may include contributions from the output of flesh correction circuit 20) is thereby achieved in a manner discussed in the copending U.S. patent application Ser. No. 249,947—Harwood, et al., now U.S. Pat. No. 4,385,311, without introduction of a phase shift at the reference oscillation frequency by the bandpass filter.

In the operation of the described hue control system, the technique employed, whereby the fixed amplitude output of the first differential amplifier (41, 42) contributes to the system output throughout the hue adjustment range, and provides the sole contribution thereto at a central balance setting, readily permits accurate setting of the range center at an intended demodulation axis. A two-to-one improvement in centering accuracy is realizable relative to prior art hue control systems of the type shown, for example, in U.S. Pat. No. 4,051,519—Harwood.

In an illustrative embodiment of the illustrated circuitry, the resistance values chosen for the matrix resistors are, as follows: resistors 31,32—2.5 kilohms each; resistors 33,35—2 kilohms each; and resistor 34—820 ohms. The magnitude of the potential $V_B'$ applied to the base electrodes of transistors 71 and 72 is selected so as to substantially match the quiescent DC potential level at oscillator output terminals E and F.

What is claimed is:

1. In apparatus for reproducing color images in response to composite color television signals inclusive of (a) a chrominance signal comprising modulated color subcarrier waves and (b) an accompanying color synchronizing component comprising bursts of oscillations of color subcarrier frequency and a reference phase; said apparatus including (1) a color reference oscillator subject to synchronization with said bursts, and providing first and second oscillatory signals of color subcarrier frequency and respective first and second phases in substantially quadrature phase relationship; (2) first and second synchronous detectors, each having a modulated signal input terminal coupled to receive said modulated color subcarrier waves, and each having a reference signal input terminal; and (3) a phase shift network connected between the respective reference signal input terminals of said detectors; a hue control system for varying the hues of said reproduced color images, comprising:

a first matrixing means for combining predetermined magnitudes of said first and second oscillatory signals to form a first matrixed oscillatory signal having a third phase lying between said first and second phases;

a second matrixing means for combining predetermined magnitudes of said first and second oscillatory signals to form a second matrixed oscillatory signal having a fourth phase leading said third phase by a predetermined phase angle;

a third matrixing means for combining predetermined magnitudes of said first and second oscillatory signals to form a third matrixed oscillatory signal having a fifth phase lagging said third phase by said predetermined phase angle;

a differential amplifier, having first and second differential inputs respectively responsive to said second and third matrixed oscillatory signals, for developing a fourth matrixed oscillatory signal having a sixth phase in quadrature with said third phase across an output load;

a source of a variable control voltage;

a source of a reference voltage;

controlled amplifier means, responsive to said first matrixed oscillatory signal, to said reference voltage, and to said variable control voltage for additionally delivering said first matrixed oscillatory signal to said output load with a magnitude dependent upon the difference, if any, between said variable control voltage and said reference voltage, and with a polarity dependent upon the sense of said difference; and means for applying the oscillatory signal appearing across said output load to said reference signal input terminal of said first synchronous detector.

2. Apparatus in accordance with claim 1:

wherein said modulated color subcarrier waves correspond to the sum of (1) color subcarrier waves of an I phase modulated by a first, relatively wideband, color difference signal, and (2) color subcarrier waves of a Q phase, differing from said I phase by 90°, modulated by a second, relatively narrowband, color difference signal;

wherein said phase shift network introduces a reference signal phase shift of approximately 90°; and wherein said sixth phase is such that application of the oscillatory signals appearing across said output load to said reference signal input terminal of said first synchronous detector normally causes said first synchronous detector to effect I-axis demodulation of said modulated color subcarrier waves in the absence of a difference between said control voltage and said reference voltage.

3. Apparatus in accordance with claim 2 wherein said differential amplifier includes first and second amplifying stages, with inputs of said first amplifying stage constituting said differential inputs of said differential amplifier, with said output load being coupled to an output of said second amplifying stage, and with an input of said second amplifying stage being responsive to the combination of an output of said first amplifying stage and an output of said controlled amplifier means.

4. Apparatus in accordance with claim 2 also including means, responsive to said chrominance signal, and to said combination of outputs, for concomitantly shifting the axes of demodulation for said first and synchronous detectors when the phase of said modulated subcarrier waves bears a predetermined relationship to the phase of said combination of outputs.

5. Apparatus in accordance with claim 4 wherein said demodulation axis shifting means is selectively enabled or disabled, and, when enabled, effects said shifts of said demodulation axes via application of an additional oscillatory signal to said output load.

6. Apparatus in accordance with claim 2 wherein said predetermined magnitudes of said first and second oscillatory signals combined by said first matrixing means are substantially equal, and wherein the ratio of the predetermined magnitudes of said first and second oscillatory signals combined by said second matrixing means is substantially complementary to the ratio of the predetermined magnitudes of said first and second oscillatory signals combined by said third matrixing means.

7. Apparatus in accordance with claim 6 wherein said first matrixing means includes the series combination of first and second resistors of substantially equal resistance value connected between first and second output terminals of said oscillator respectively supplied with said first and second oscillatory signals in substantially similar magnitudes; and an output lead connected to the junction of said first and second resistors.

8. Apparatus in accordance with claim 7 wherein said second matrixing means includes an additional series combination of resistors connected between said first and second output terminals of said oscillator, said additional series combination including third and fourth resistors of substantially equal resistance value interconnected by a fifth resistor; and an output lead connected to the junction of said third and fifth resistors; and wherein said third matrixing means includes said additional series combination, and an output lead connected to the junction of said fourth and fifth resistors.

9. In apparatus for reproducing color images in response to composite color television signals inclusive of (a) a chrominance signal comprising modulated color subcarrier waves and (b) an accompanying color synchronizing component comprising bursts of oscillations of color subcarrier frequency; said apparatus including (1) a color reference oscillator subject to synchronization with said bursts, and providing first and second oscillatory signals of color subcarrier frequency and respective first and second phases in substantially quadrature phase relationship; (2) first and second synchronous detectors, each having a modulated signal input terminal coupled to receive said modulated color subcarrier waves, and each having a reference signal input terminal; and (3) a phase shift network connected between the respective reference signal input terminals of said detectors; a hue control system for varying the hues of said reproduced color images, comprising:

matrixing means for combining predetermined magnitudes of said first and second oscillatory signals to form a third oscillatory signal having a third phase lying between said first and second phases;

a differential amplifier of substantially fixed gain, having first and second differential inputs, for developing a fourth oscillatory signal having a phase in quadrature with said third phase across an output load, said first input being responsive to an oscillatory signal derived from said oscillator and having a phase leading said third phase, and said second input being responsive to an oscillatory signal derived from said oscillator and having a phase lagging said third phase;

a source of a variable control voltage;

a source of a reference voltage;

controlled amplifier means, responsive to said third oscillatory signal, to said reference voltage, and to said variable control voltage for additionally delivering said third oscillatory signal to said output load only when a difference exists between said variable control voltage and said reference voltage, with a magnitude dependent upon the magnitude of said difference, and with a polarity dependent upon the sense of said difference; and means for applying the oscillatory signal appearing across said output load to said reference signal input terminal of said first synchronous detector.

10. Apparatus in accordance with claim 9:

wherein said modulated color subcarrier waves correspond to the sum of (1) color subcarrier waves of an I phase modulated by a first, relatively wideband, color difference signal, and (2) color subcarrier waves of a Q phase, differing from said I phase by 90°, modulated by a second, relatively narrowband, color difference signal; and wherein said phase of said fourth oscillatory signal is such that application of the oscillatory signals appearing across said output load to said reference signal input terminal of said first synchronous detector normally causes said first synchronous detector to effect I-axis demodulation of said modulated color subcarrier waves in the absence of a difference between said control voltage and said reference voltage.

11. Apparatus in accordance with claim 10 wherein said differential amplifier includes first and second amplifying stages, with inputs of said first amplifying stage constituting said differential inputs of said differential amplifier, with said output load being coupled to an output of said second amplifying stage, and with an input of said second amplifying stage being responsive to the combination of an output of said first amplifying stage and an output of said controlled amplifier means.

12. Apparatus in accordance with claim 10 also including means, responsive to said chrominance signal, and to said combination of outputs, for concomitantly shifting the axes of demodulation for said first and synchronous detectors when the phase of said modulated subcarrier waves bears a predetermined relationship to the phase of said combination of outputs.

13. Apparatus in accordance with claim 12 wherein said demodulation axis shifting means is selectively enabled or disabled, and, when enabled, effects said shifts of said demodulation axes, via application of an additional oscillatory signal to said output load.

14. Apparatus in accordance with claim 9 wherein said oscillatory signal having a phase leading said third phase is developed by second matrixing means for combining predetermined magnitudes of said first and second oscillatory signals, and wherein said oscillatory signal having a phase lagging said third phase is developed by third matrixing means for combining predetermined magnitudes of said first and second oscillatory signals.

15. Apparatus in accordance with claim 14 wherein said predetermined magnitudes of said first and second oscillatory signals combined by said first named matrixing means are substantially equal, and wherein the ratio of the predetermined magnitudes of said first and second oscillatory signals combined by said second matrixing means is substantially complementary to the ratio of the predetermined magnitudes of said first and second oscillatory signals combined by said third matrixining means.

* * * * *